United States Patent
Kulakowski

(10) Patent No.: US 8,700,016 B2
(45) Date of Patent: Apr. 15, 2014

(54) METHOD FOR PERFORMING USSD SERVICES IN A TELECOMMUNICATIONS NETWORK

(75) Inventor: Henryk Kulakowski, Jaroszowa Wola (PL)

(73) Assignee: Masspay SP. ZO.O., Jaroszowa Wola (PL)

( * ) Notice: Subject to any disclaimer, the term of this patent is extended or adjusted under 35 U.S.C. 154(b) by 132 days.

(21) Appl. No.: 13/320,457

(22) PCT Filed: May 12, 2010

(86) PCT No.: PCT/PL2010/000035
§ 371 (c)(1),
(2), (4) Date: Nov. 14, 2011

(87) PCT Pub. No.: WO2010/131989
PCT Pub. Date: Nov. 18, 2010

(65) Prior Publication Data
US 2012/0058753 A1    Mar. 8, 2012

(30) Foreign Application Priority Data
May 12, 2009    (PL) ........................................ 388012

(51) Int. Cl.
*H04W 4/14*    (2009.01)
(52) U.S. Cl.
USPC .......................................... 455/415; 370/331
(58) Field of Classification Search
CPC ....... H04M 1/57; H04M 3/533; H04W 36/18; H04L 29/06027
USPC ................ 455/466, 456.1, 433, 414.3, 456.2; 379/88.17; 705/39; 709/231
See application file for complete search history.

(56) References Cited

U.S. PATENT DOCUMENTS

| | | | |
|---|---|---|---|
| 6,764,003 B1 | 7/2004 | Martschitsch et al. | |
| 7,478,065 B1 | 1/2009 | Ritter et al. | |
| 7,720,709 B1 | 5/2010 | Langer et al. | |
| 8,107,953 B2 * | 1/2012 | Zimmerman et al. | 455/433 |

(Continued)

FOREIGN PATENT DOCUMENTS

| | | |
|---|---|---|
| EP | 0986275 A1 | 3/2000 |
| EP | 1 150 479 A2 | 10/2001 |

(Continued)

OTHER PUBLICATIONS

Digital Cellular Telecommunications System (Phase 2+); Universal Mobile Telecommunications System (UMTS); LTE; Unstructured Supplementary Service Data (USSD); Stagel (3GPP TS 22.090 version 8.0.0 Release 8); ETSI TS 122 090 v8.0.0, Jan. 1, 2009.

(Continued)

*Primary Examiner* — Phuoc H Doan
(74) *Attorney, Agent, or Firm* — Andrew M. Calderon; Roberts Mlotkowski Safran & Cole, P.C.

(57) ABSTRACT

A method for providing services in a telecommunication network with the use of USSD channel, comprising of a step of receiving (102), by a terminal device (DT), a call establishment request for a voice connection from an initiating terminal with a recipient's telephone number,—a step of rejecting (108) the call establishment request for the voice connection, if the call establishment request is determined (104, 106) to be a request for USSD based services. In subsequent steps information about the rejected call request is transmitted (110) from the terminal device (DT) to a server (GTW), the information including at least the telephone number of the terminal (OT) initiating the voice connection, and in the following steps the server (GTW) establishes (112) a USSD session and initiates (114) an exchange of messages from the server (GTW) via the USSD channel.

20 Claims, 2 Drawing Sheets

(56) References Cited

U.S. PATENT DOCUMENTS

| | | | |
|---|---|---|---|
| 8,208,442 B2* | 6/2012 | Mahdi et al. | 370/331 |
| 2008/0103984 A1 | 5/2008 | Choe et al. | |
| 2008/0154735 A1 | 6/2008 | Carlson | |
| 2008/0177662 A1 | 7/2008 | Smith et al. | |
| 2012/0058753 A1 | 3/2012 | Kulakowski | |
| 2012/0078737 A1 | 3/2012 | Kulakowski | |

FOREIGN PATENT DOCUMENTS

| | | |
|---|---|---|
| EP | 1 471 755 A1 | 10/2004 |
| WO | 02/11086 A2 | 2/2002 |
| WO | 2004-049271 A2 | 6/2004 |
| WO | 2004049271 A2 | 6/2004 |
| WO | 2005-060282 A1 | 6/2005 |

OTHER PUBLICATIONS

USSD Services for Interactive Mobile Users—Building User-Friendly Mobile telephony Applications Using Dialogic TM Distributed Signaling Interface Components, Dialogic Making Innovation ThriveTM, XP-002528245; Aug. 31, 2008.

International Search Report PCT/PL2010/000035; mailed Oct. 26, 2010.

Office Action for U.S. Appl. No. 13/320,433 dated Jul. 18, 2013.

Dialogic Corp.,"USSD Services for Interactive Mobile Users—Building User-Friendly Mobile Telephony Applications Using Dialogic TM Distributed Signaling Interface Components" Internet Citation, Aug. 31, 2008, pp. 1-17, XP002528245, Retrieved from the Internet: URL: http://www.dialogic.com products/docs/appnotes/11038$_{13}$ USSD$_{13}$ an.pdf [retrieved on May 11, 2008] p. 3, col. 1, line 1-line 3, Montreal, Canada.

U.S. Appl. No. 13/320,433 filed on Nov. 14, 2011, published as U.S. Pub. No. 2012/0078737.

International Search Report of PCT/PL2010/000034 mailed Oct. 26, 2010.

Written Opinion of International Searching Authority of PCT/PL2010/000034 mailed Oct. 26, 2010.

\* cited by examiner

METHOD FOR PERFORMING USSD SERVICES IN A TELECOMMUNICATIONS NETWORK

CROSS-REFERENCE TO RELATED APPLICATIONS

The present Application is a US national phase of PCT/PL2010/000035 filed on May 12, 2010 ("PCT Application"), which claims priority from Polish Application No. P-388012 filed on May 12, 2009 all of which are hereby incorporated by reference in their entirety into the present Application.

FIELD OF THE INVENTION

This invention relates generally to telecommunications networks, particularly to methods for exchanging messages and providing services in real time.

STATE OF THE ART

There are many existing standards for exchanging text messages in telecommunications networks. The most common service of this type is text based Short Message Service (SMS). SMS text message may be sent by a user of a mobile network to another user or to a computer server. It may also be sent by a server to a selected user. While it has many advantages, the SMS service suffers from drawbacks that eliminate it from use for certain applications.

The first problem with SMS is that as an asynchronous, store-and-forward service, SMS does not guarantee the time of message delivery. An SMS message sent by a user is retransmitted by subsequent elements of the network and is first received by the SMS server. Only then it is delivered to the destination user while traversing the reverse path. In conditions of low network occupancy, SMS messages are delivered shortly after they are sent. However, in the case of high network traffic the delivery time may significantly increase. In many cases (e.g., mobile payments, on-line voting) there is a requirement for instantaneous delivery or delivery with a guarantee that the delay will not exceed a certain maximum time.

The second problem is that an SMS message, sent or received by a handset, is stored in the memory of the handset.

A service which does not suffer from the above problems is the service provided via the Unstructured Supplementary Service Data (USSD) channel. The advantage of this service over SMS is that a logical end-to-end session is established between a user's handset and a server, before messages are exchanged. Once the session is established, the messages are exchanged synchronously, virtually in real time. If, for whatever reasons, the session cannot be established, (e.g., due to network congestion) no messages are exchanged. USSD service allows for unequivocal and fast determination as to whether a connection may be established and messages may be sent. Unfortunately, the USSD service suffers from its own drawbacks. A session with a server is established from the user's handset in response to the user dialing a sequence in a format of *1XX*NNNN#, where XX is a number (short code) in the range of 00-99. The relatively narrow range of short codes (100) does not allow for offering services of large variety and sophistication. Of course, the digits that follow the short code (NNN) may be used for additional service identification. However, identifying such service becomes more complicated (e.g., *134*145#). Another issue with short codes for USSD service identification is the fact that such queries (unlike those SMS based), may be only used within the subscriber's home network, i.e., they will not work in roaming conditions for network compatibility reasons.

SUMMARY OF THE INVENTION

In its first aspect the present invention encompasses a method for implementing services in telecommunications networks with the use of the USSD channel. The method comprises a step of receiving by the terminal device a call establishment request for a voice connection to the recipient's telephone number, and then rejecting the call request, if the call request is determined to be a request for USSD based services. In subsequent steps, information about the rejected call request is transmitted from the terminal device to a server, the information including at least the telephone number of the terminal initiating the connection, and then the server establishes a USSD session and initiates the exchange of messages via the USSD channel.

In another aspect the present invention encompasses a method for implementing services with the use of USSD channel in telecommunications networks comprised of a terminal device and a server adapted for that purpose. The terminal device is adapted to receive a call establishment request for a voice connection to the recipient's telephone number and to reject this call request, if this call request is determined to be a request for USSD based services. The terminal device is also adapted to transmit the information about the rejected call request, comprising at least the telephone number of the terminal initiating the connection to the server which, in turn, is adapted to establish a USSD session and to exchange messages via USSD channel.

Other elements of this invention are described in dependent claims.

BRIEF DESCRIPTION OF DRAWINGS

The invention is further explained with reference to the accompanying drawing in which.

DETAILED DESCRIPTION

Various embodiments of the present invention allow for the provision of USSD services in a simpler and more intuitive manner than the traditional methods based on the USSD standard specification, and to make them available also in roaming conditions for users of telecommunications networks other than the network of the operator offering the considered services. Keypads of modern telephone handsets work according to the DTMF standard and allow the user to dial another user's phone number by using digits from "0" to "9" as well as certain special characters, i.e. "*" and "#". The standard, commonly accepted, numbering system consists of digits from 0 to 9 only. In the case of premium type services the "*" character is used occasionally at the beginning of the telephone number to indicate that the attempted connection will be charged at a higher rate. In most cases, however, the characters "*" and "#" are used for navigation in menus of the Interactive Voice Response (IVR) systems. Also, these characters, in a specified format, are used for invoking USSD based services.

Figure 1:
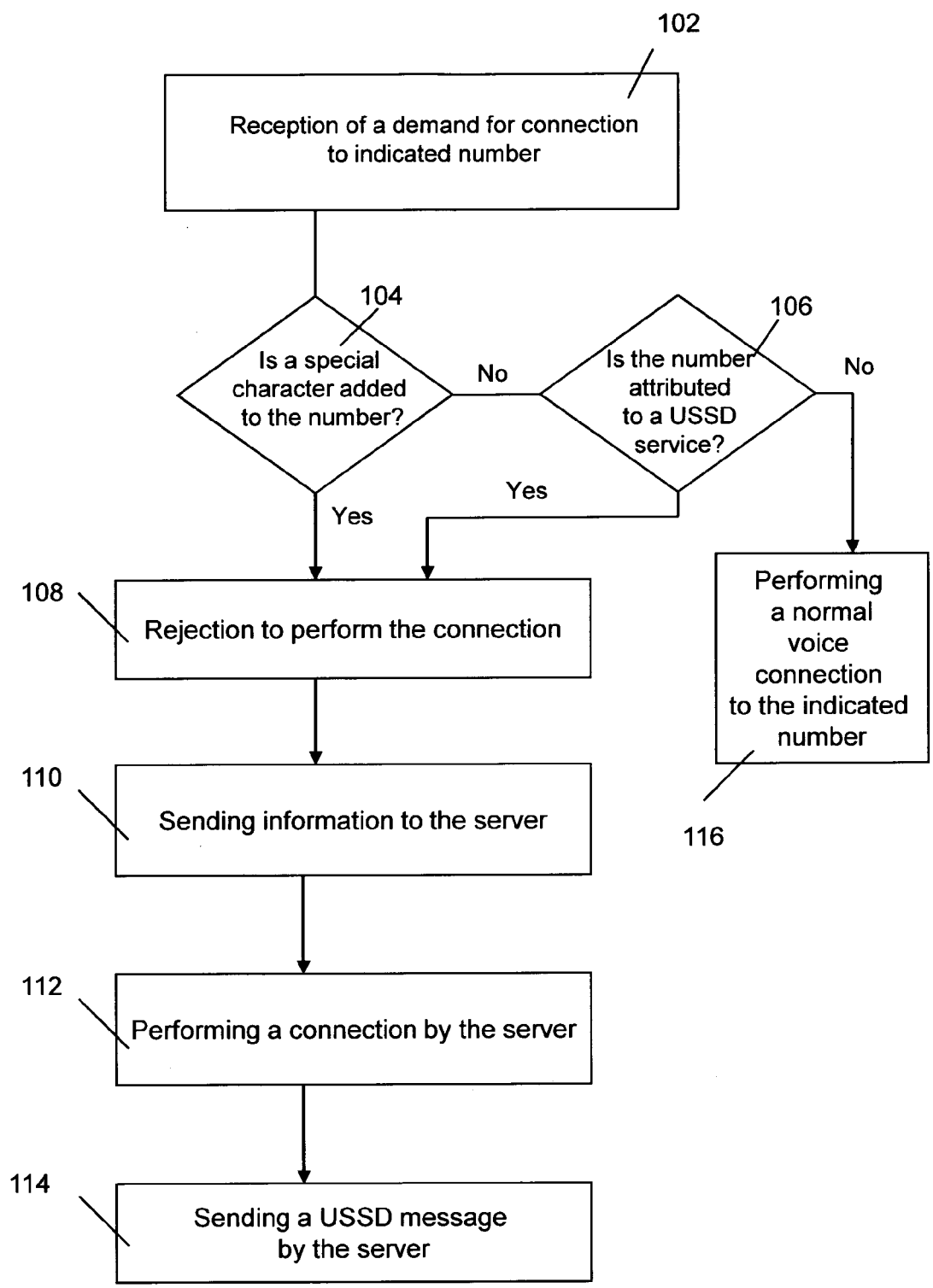
FIG. 1 illustrates a method for providing a service in a telecommunications network in the first embodiment of the present invention.

FIG. 1 shows a method of providing service in telecommunications networks in the first embodiment of the present invention. The type and the nature of the services are not the object of this invention, but examples of services are presented below in the specification for illustration purposes. According to this method, in terminal device DT a call establishment request for a voice connection with the recipient's telephone number is received, 102, and then this request is rejected, 108, if this request is determined, 104, 106, to be a request for USSD based services. The determination of the call request as a request for a USSD based service may happen in a number of ways. In the first embodiment, the determination is carried out based on one or more special characters "*" or "#" inserted into the dialed string. It is also possible to define special characters other than those indicated above. In another embodiment, the dialed telephone number itself, without any special characters, unequivocally identifies the service to be USSD based, if the terminal device number is associated with a USSD based service. It is therefore possible to apply this method to offer services in roaming conditions on networks other than the home network of the subscriber. After the steps of service type determination and call request rejection are completed, the call request parameters, containing at least the telephone number of the initiating terminal OT or the number suggested by the user of the initiating terminal OT are transmitted, 110, to server GTW. In the last step the server GTW initiates the message exchange via the USSD channel. In one embodiment, discussed below, this message is sent to the terminal OT initiating the connection. In another embodiment this message is sent to another terminal. In one embodiment the service is performed by sending a USSD message from the server GTW to the initialising terminal, whereas in another embodiment this message is one of the elements of the service.

If the call request is not determined to be a request for USSD based services, 104, 106, a normal voice connection is established, 116.

Preferably, the information about the rejected call request also contains the telephone number of the recipient.

In other embodiments, a telephone exchange, an IVR system, a programmable modem, or other telephone apparatus may function as the terminal device DT.

Figure 2:
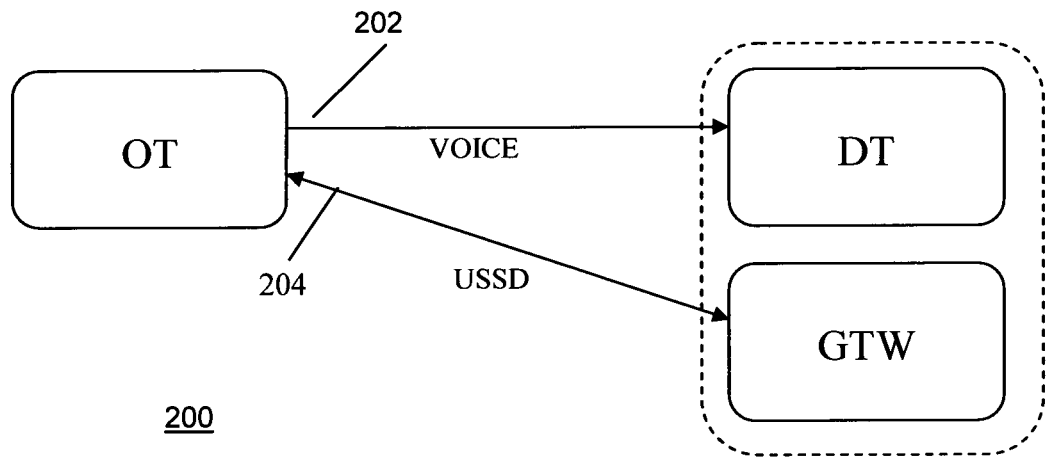
FIG. 2 shows a telecommunications network in the first embodiment of the present invention.

FIG. 2 shows an example of the present invention employed for providing a text service with the use of USSD channel. In currently known solutions, to initiate a USSD session a user dials a string defined by the USSD standard (*1XX* . . . #), which results in a request for a session establishment with the server. In the method claimed in the present invention a user dials a telephone number, which instead of resulting in a voice connection, 202, causes the server GTW to establish a USSD session, 204. A telephone apparatus works as the initiating terminal OT, which is identified in the telecommunications network by the telephone number of the telephone subscriber. The user dials the recipient's telephone number on the initiating terminal OT and a call establishment request for a voice connection, 202 VOICE, arrives at the terminal device DT. The terminal device DT instantaneously rejects this call establishment request and no voice connection is established. At the same time, the terminal device DT, which in one embodiment is e.g. a digital telephone exchange, transmits the information about the received call establishment request to the server GTW, which establishes a USSD session with the initiating terminal OT using the number of the initiating terminal OT, transmitted to the server by the terminal device DT, and the recipient's number. Consequently, USSD messages are exchanged, 204, during the session.

The recipient's number dialed on the initiating terminal OT may be a standard telephone number consisting of digits only. Preferably it may include, at any position, one or more special characters "*" or "#", this indicating that the call is to be serviced in the text mode over the USSD channel, where the standard number may be employed for servicing a voice connection whereas a number containing the special characters may be used for servicing a connection that includes a USSD message exchange.

Figure 3:
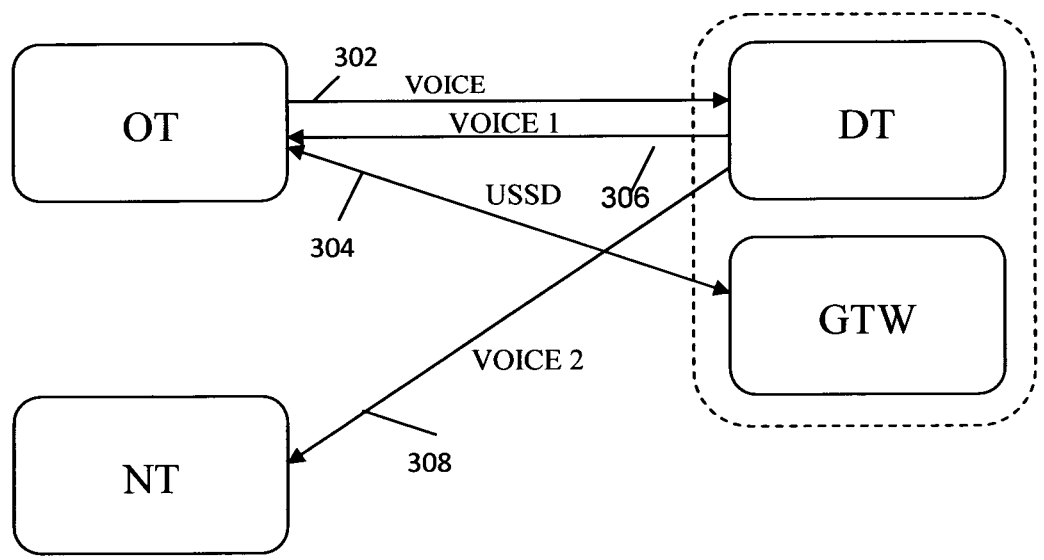
FIG. 3 shows a telecommunications network in the second embodiment of the present invention.

In another embodiment a user dials a recipient's number on the initiating terminal OT, the number being delivered to the terminal device DT with a call establishment request for a voice connection, 302 VOICE. This call establishment request is rejected, as a result of which the server GTW establishes a USSD session, 304. During the exchange of the USSD messages, 304, between the server GTW and the initiating terminal OT it is possible to establish a voice channel connection, VOICE 1 306, which is shown in FIG. 3. During the exchange of the USSD messages, 304, the server GTW reports to the terminal device DT a call establishment request for a voice connection, VOICE, 1 with the initiating terminal OT. The server GTW may additionally send a call establishment request for a second voice connection, VOICE 2 308, with a second terminal NT, where the terminal device DT works as a transmitter of the voice communication between the initiating terminal OT, and the second terminal NT (in the first embodiment this being the telephone of the second subscriber).

The shown solution has certain advantages relative to the common way of using the standard USSD dialing procedures. Firstly, it does not limit the numbering range to 00-99 and simplifies the format of telephone numbers used for initiating the text session. The numbers used for establishing a USSD session are identical to those used for establishing the communication on the voice channel. Adding a special character "*" or "#" in the dialed string allows to easily distinguish such a string from a number dedicated to voice connections. Another advantage is that the service may be offered not only for users of the home network but also for foreign networks users. A foreign network subscriber dials a voice number consistent with the local numbering scheme defined on the network in which the considered service is offered, this resulting in sending a call establishment request for a voice connection between the terminal on the foreign network and the terminal device on the network in which the service is offered, with the terminal device rejecting this call request. Next, a USSD session is established from the server in the network in which the service is offered to the terminal in the foreign network. Such functionality is not possible with the use of the standard USSD dialing procedures. From the user's perspective, the user dials a recipient's telephone number on user's handset (the number may include a special character), which generates an attempt to establish a standard voice connection, as a result of which a USSD message arrives at user's handset. This method opens possibilities to widen functional scope of services offered by the operators, including those for the users of foreign networks, which is particularly important if the USSD functionality is not widely used and inter-operators agreements are not in place as it is normally the case for the voice or SMS channels. The possibility of offering services with guaranteed time of delivery for users of foreign networks with the use of a homogenous solution and resulting new types of value added services is extremely attractive for service providers.

FIGS. 2 and 3 show a telecommunications network 200, 300 in embodiments of the present invention. The network node containing the terminal device DT and the server GTW is adapted for performing services delivered to the initiating terminal OT, the services being based, inter alia, on delivering text messages with guaranteed delivery time of the message (guaranteed maximum delay), the time being negligible. The terminal device DT is adapted to receive a call establishment request for a voice connection with the recipient's telephone number or another terminal NT, and to reject the call request, if the call request is determined to be a request for USSD based services. The server GTW is connected to the terminal device DT and adapted to receive information about the rejected call request containing at least the telephone number of the initiating terminal OT. Based on the received information, the server GTW establishes a USSD session with the initiating terminal OT. Also, the terminal device DT is adapted to establish a voice connection with the initiating terminal OT or another terminal NT, with the terminal device DT working as a re-transmitter of voice communication. After establishing this connection, the server GTW initiates a USSD message exchange with the initiating terminal OT or with another terminal NT.

In a preferred embodiment, the adaptation of the network includes installing and executing a software application that implements the method described in the present invention, in one or more terminal devices and servers GTW.

In an alternative embodiment the adaptation of the network is based on installing a hardware module in the terminal device DT, with an embedded software application that implements the method described in the embodiments of the present invention.

Examples below present the embodiments of services based on USSD message exchanges in a telecommunications network or networks, according to the present invention.

EXAMPLE 1

In the first example the method according to the present invention enables the implementation of a service in which single-use access codes are generated for the access to a web service (e.g., a bank website). To obtain a single-use access code, a user of any network dials, 102, the number 601602603, which belongs to the standard range of numbers assigned to voice calls in the local numbering system. However, since a text service has been associated, 106, with this number, the call request for a voice connection is rejected, 108, by the exchange (terminal device DT) of the telecommunications operator, and the relevant information is forwarded, 110, to the server GTW. The server GTW receives the information that the subscriber with the number 602333333 has called the subscriber with the number 601602603. Because the service of generating and delivering, in a text mode, a single-use access code is attributed to the number 601602603, the server GTW knows what service should be provided to which user. The server GTW identifies the calling subscriber's telephone number 602333333 as a number authorised for this service, and generates a single-use access code, which is delivered by the server GTW, 112, 114, to the user in a USSD message in real time. This code, along with the subscriber's telephone number or login id authorises the subscriber to log into the web service. In this embodiment, the server GTW has initiated the service based on the fact that the called number 601602603 was associated with this service. However, in another embodiment, an IVR system is employed as the terminal device DT, which includes a software application that implements the said service. The IVR system rejects the incoming voice connection and sends a USSD message, containing only the calling number 602333333, to the server GTW. The called number is not forwarded since a single IVR system may provide multiple services at multiple called numbers. In one embodiment the server GTW provides only a single service, the service is unequivocally identified without the need of forwarding the called number 601602603 to the server. However, in alternative embodiments, in which the server GTW provides multiple services, forwarding the called number may be necessary to identify the service unequivocally. In the following embodiment the server GTW provides more than one service with designated telephone numbers assigned for each service. In this embodiment the server GTW services many telephone numbers and each of the numbers is associated with a dedicated port on the server GTW. In this embodiment, a message received by the server GTW on a specific port unequivocally identifies the number called by the user, thus identifying the service requested by that user. Alternatively, the same service may be provided with a modem connected to a computer acting as the terminal device DT. Upon the arrival of an incoming call request for a voice connection, the modem rejects the request and forwards calling number to the computer. A software application installed on the computer creates and sends a message to the server GTW that contains the number obtained from the modem. A single computer may be connected to multiple modems.

EXAMPLE 2

In the second embodiment the method according to the invention enables the implementation of automated customer service offered by a bank to its customers at number 0-800-BANK. Calls to this number are directed to the bank's IVR system (acting as the terminal device DT) equipped with appropriate software application. After the customer dials the customer service number, 102, an attempt to establish a voice connection is made. This call request is rejected, 108, by the IVR system since the number 0-800-BANK has been associated, 106, with a text based service. Consequently, after rejecting this request, relevant information is forwarded, 110, from the IVR system to the server GTW. The server GTW establishes, 112, a USSD session with the customer's handset and customer receives, 114, a text menu from which to navigate. The menu and the following interactions are executed over the USSD channel. At a second number, 0-801-BANK, a similar service is made available, which is serviced entirely by the IVR system over a voice connection and offers the interactions with the use of DTMF and voice recognition technology.

EXAMPLE 3

The first subscriber, 501502503 calls a second subscriber's number 601602603 which has a format consistent with the local numbering system. A standard voice connection is established as a result of this action. In the third embodiment, the method according to the invention enables the implementation of a "call back" service by the operator of the network on which the first user is located. In this service the first subscriber, when dialing the number of the second subscriber, adds the character "*" at the end of the dialed string, i.e., 601602603*. Once the string is dialed, an attempt to establish a voice connection is made, 102, to the exchange acting as the terminal device DT. The call establishment request for the voice connection is rejected, 108, because of the presence of the special character "*" in the dialed string, 104. Once the call request is rejected, 108, relevant information about this fact is transmitted, 110, from the exchange DT to the server GTW. This information contains the telephone number of the first subscriber, the telephone number of the second subscriber including the special character "*" added thereto as the service identifier. The server GTW establishes, 112, a USSD session with the second subscriber's phone and uses it to forward a message, 114, that reads: "The subscriber 501502503 is requesting a connection. To confirm, press 1; To reject press Disconnect." Pressing "1", by the second subscriber results in a USSD message containing the character "1" being sent to the server and in a voice connection to be established. The connection is established separately between the exchange DT and the first subscriber as well as between the exchange DT and the second subscriber. The exchange DT re-transmits the voice communication. In a preferable embodiment, the second subscriber is charged for this connection. The service can be targeted towards parents who want to be sure that their child will be able to contact them even if the balance of their child's pre-paid telephone account does not allow making a normal voice call.

EXAMPLE 4

The first subscriber, 501502503, calls a second subscriber's number 601602603 which has a format consistent with the local numbering system. A standard voice connection is established as a result of this action. In the fourth embodiment, the method according to the invention enables the implementation of a service, in which the operator of the network in which the first subscriber is located, enriches the functionality of a connection, if the first subscriber, who initiated the connection adds, at the beginning of the dialed number, the special character "#". Following the dialing of the string #601602603, an attempt to establish a voice connection is made, 102. The call establishment request for the voice connection is rejected, 108, because of the presence of the special character "#" in the dialed string, 104. Once the call request is rejected, 108, relevant information about this fact is transmitted, 110, from the exchange DT to the server GTW. This information contains the telephone number of the first subscriber, the telephone number of the second subscriber including the special character "#" added thereto as the service identifier. The server GTW establishes, 112, a USSD session with the second subscriber's phone and uses it to forward a message, 114, that reads: "To record the call, press 1. To send a voice message, press 2. To make a normal call, press 3." Depending on the option selected by the first subscriber, the corresponding action is executed. In case "1" is selected, a USSD message is sent to the server GTW, containing the number "1", and a voice connection is established between the first subscriber and the second subscriber and the entire call is recorded on the operator's server. In case "2" is selected, a USSD message is sent to the server GTW, containing the number "2", and a voice connection is established and used by the first subscriber to record a voice message which is consequently sent to the second subscriber. In case "3" is selected, a USSD message is sent to the server GTW, containing the number "3", and a standard voice connection is established between the first subscriber and the second subscriber.

EXAMPLE 5

In order to increase the security of card payments in web commerce, web sites often employ PIN codes for payer authentication and deliver them via a mobile phone. After a user enters the payment card number on the website, a phone number is displayed for the payer to call and enter the PIN number of the corresponding card. The connection requested by the user, 102, is serviced by a telecommunications modem connected to a computer designated to servicing of payments. The modem rejects the call request automatically, 108, since the called number is associated, 106, with a USSD based service, and the calling number is forwarded, 110, to the computer. A single computer may be connected to multiple modems associated with their own separate called numbers, which in case of multiple transactions being processed simultaneously, allows to display on the website different numbers for different users. A software application installed in the computer sends a request to the server GTW to establish, 112, a USSD session to the user's handset. The server GTW uses the USSD session to send, 114, a message to the user, requesting the input of the payment card PIN code. The PIN code is entered by the user and sent by the server GTW to a computer, which verifies it and displays the transaction confirmation code on the website.

EXAMPLE 6

The first subscriber, 501502503 calls a second subscriber's number 601602603 which has a format consistent with the local numbering system. A standard voice connection is established as a result of this action. Similarly to the third embodiment, in the sixth embodiment the method according to the invention enables an implementation of a service, in which the operator of the network in which the first subscriber is located, enriches the functionality of a connection, if the first subscriber, who initiated the connection adds, at the beginning of the dialed number, the special character "#" and an number representing an amount, e.g., 601602603#20. Such service is provided identically to the Example 3 and results in a transfer of the amount of 20 units of currency from the account of the subscriber 501502503 to the account of the subscriber 601602603. Additionally, during the USSD session the subscriber 501502503 may be asked to enter the PIN code for authentication purposes, and the payment confirmation is sent to both subscribers in the form of USSD messages.

EXAMPLE 7

A Cable TV operator offers automated customer service at a number 0-800-CABLE-TV. Normally, this number is used to establish a voice connection. To use the automated customer service, a user must register on the website of the Cable TV operator, and set the appropriate options for handling the calls to the number 0-800-CABLE-TV as voice calls or text calls. After activating the account in the web service, the user calls the number 0-800-CABLE-TV, which is connected to the IVR system acting as the terminal device DT. Upon the arrival of the call request, the IVR system sends a query to the server GTW on which the user's profile is stored, to enquire about this user's mode. Based on the user's profile configuration, the server GTW responds to the IVR system, and indicates whether the call request should be accepted as a voice call or rejected in order to establish a USSD session with the user's handset. In case of call request rejection, the service is provided in a similar manner to what has been described in Example 2.

EXAMPLE 8

A subscriber has a software application installed in subscriber's handset which acts as the terminal device DT and offers additional functionality to incoming call processing. One function of the application is the auto-response for uncompleted calls. The user may define a different response for rejected calls, for example "Please excuse me, I cannot talk right now. I will call back later" and a different response for a call waiting condition, for example: "I am on another call right now, please call later." Upon the arrival of incoming call, 102, the software application displays relevant information on the handset screen and the subscriber may reject this call, 108. Consequently, the software application contacts, 110, the server GTW and the server GTW uses the USSD channel to send, 112, 114, a message defined for the rejected call condition, to the calling number. A similar procedure is performed in the call waiting conditions. The subscriber may also reject the call and have the software application on the subscriber's handset send an instruction to the server GTW to use the USSD channel to send out a message defined for call waiting conditions. In both cases the user may optionally configure the software application to automatically reject calls. When the software application is configured with the option "unavailable for incoming calls", all incoming calls are rejected and a relevant message is sent out via the server GTW, over the USSD channel to the calling number. Thus in this configuration subscriber number is designated to be serviced with USSD messages. All call establishment requests for voice connections are rejected, 108, based on the USSD service designation, 106, of the subscriber's number in the subscriber's profile. In a similar manner, all incoming voice calls may be rejected automatically during in call waiting conditions. Additionally and preferably, in case of call rejection in call waiting conditions, once the active call is completed, a USSD message is sent to the calling number to report the availability of the called subscriber to take calls.

The invention claimed is:

1. A method for providing services in a telecommunication network, using USSD channel, comprising of the following steps:
   receiving by the terminal device (DT) a call establishment request for a voice connection to the recipient's telephone number,
   rejecting the call establishment request for the voice connection, if the call request is determined to be a request for USSD based services,
   transmitting information about the rejected call request from the terminal device (DT) to a server (GTW), the information including at least the telephone number of the terminal (OT) initiating the connection,
   establishing a USSD session by the server (GTW), and initiating an exchange of messages from the server (GTW) via the USSD channel.

2. A method according to claim 1 wherein the information about the rejected call request contains the recipient's telephone number.

3. A method according to claim 1 wherein the determination of the mode of communication, text or voice is based on the information obtained by the terminal device (DT) from the server (GTW).

4. A method according to claim 1 wherein the determination of the mode of communication, text or voice, is based on the configuration profile of the user initiating the connection to the dialled number.

5. A method according to claim 1 wherein the telephone exchange, an IVR system, a telecommunications modem, or a telephone handset acts as the terminal device (DT).

6. A method according to claim 1 wherein the terminal device (DT) establishes a voice connection (VOICE 1) to the initiating terminal (OT) during the USSD session.

7. A method according to any of claim 1 wherein the terminal device (DT) establishes a voice connection (VOICE 1) to the initiating terminal (OT) during the USSD session (304), and a second voice connection is established (VOICE 2) to a second terminal (NT), in which the terminal device (DT) acts as a re-transmitter of the voice communication between the initiating terminal (OT) and the second terminal (NT).

8. A method according to claim 7 wherein the server (GTW) establishes a connection between the server (GTW) and the second terminal (NT) and initiates an exchange of text messages between the server (GTW) and the second terminal (NT).

9. A method according to claims 1 wherein the determination of the call establishment request for a voice connection to be a request for USSD based services is based on presence of at least one special character in the called number.

10. A method according to claims 1 wherein the determination of the call establishment request for a voice connection to be a request for USSD based services is based on the fact that the USSD based text service is attributed to the called number.

11. A telecommunications network comprising a terminal device (DT) and a server (GTW), adapted to provide USSD based text messages in the telecommunications network, the terminal device (DT) being adapted to receive a call establishment request for a voice connection to the recipient's telephone number and to reject the call request for the voice connection, if the call request is determined to be a request for USSD based services, the terminal device (DT) also adapted to transmit information about the rejected call request, comprising of at least the telephone number of the terminal (OT) initiating the connection, to the server (GTW) which, in turn, is adapted to establish and use a USSD session for exchanging of messages.

12. A telecommunications network according to claim 11 wherein the information about the rejected call request also contains the recipient's telephone number.

13. A telecommunications network according to claim 11 wherein the terminal device (DT) is adapted to determine if the call establishment request for a voice connection is a request for USSD based services, based on information obtained by the by the terminal device (DT) from the server (GTW).

14. A telecommunications network according to claim 11 wherein the terminal device (DT) is adapted to determine if the call establishment request for a voice connection is a request for USSD based services based on the configuration profile of the user initiating the connection, defining the mode—text or voice—for servicing the dialled number.

15. A telecommunications network according to claim 11 wherein a telephone exchange, an IVR system, a telecommunications modem, or a telephone handset acts as the terminal device (DT).

16. A telecommunications network according to claim 11 wherein the terminal device (DT) is adapted to establish a voice connection (VOICE 1) to the initiating terminal (OT) during the USSD session.

17. A telecommunications network according to claim 11 wherein the terminal device (DT) is adapted to establish a voice connection (VOICE 1) to the initiating terminal (OT) during the USSD session, and to establish a second voice connection (VOICE 2) to a second terminal (NT), with terminal device (DT) acting as a re-transmitter of the voice communication between the initiating terminal (OT) and the second terminal (NT).

18. A telecommunications network according to claim 17 wherein the server (GTW) is adapted to establish a connection between the server (GTW) and the second terminal (NT)

and initiate an exchange of text messages between the server (GTW) and the second terminal (NT).

19. A telecommunications network according to claim 11 wherein the terminal device (DT) is adapted to determine if the call establishment request for a voice connection is a request for USSD based services is based on presence of at least one special character in the called number.

20. A telecommunications network according to claim 11 wherein the terminal device (DT) is adapted to determine if the call establishment request for a voice connection is a request for USSD based services is based on the fact that the USSD based text service is attributed to the called number.

\* \* \* \* \*